US012164417B2

(12) United States Patent
Ito et al.

(10) Patent No.: US 12,164,417 B2
(45) Date of Patent: Dec. 10, 2024

(54) MEMORY CONTROLLER TO PROCESS REQUESTS FOR DRAM, CONTROL METHOD FOR MEMORY CONTROLLER, AND STORAGE MEDIUM

(71) Applicant: CANON KABUSHIKI KAISHA, Tokyo (JP)

(72) Inventors: Motohisa Ito, Chiba (JP); Daisuke Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 17/719,255

(22) Filed: Apr. 12, 2022

(65) Prior Publication Data

US 2022/0350735 A1 Nov. 3, 2022

(30) Foreign Application Priority Data

Apr. 26, 2021 (JP) .................................. 2021-074084

(51) Int. Cl.
*G06F 12/02* (2006.01)
(52) U.S. Cl.
CPC .... *G06F 12/0238* (2013.01); *G06F 2212/251* (2013.01)
(58) Field of Classification Search
None
See application file for complete search history.

(56) References Cited

U.S. PATENT DOCUMENTS

| 8,307,165 | B1* | 11/2012 | Keil ..................... G06F 13/1631 |
| | | | 711/134 |
| 9,069,489 | B1* | 6/2015 | Mizrahi .............. G06F 12/0804 |
| 2011/0179200 | A1* | 7/2011 | Sukonik .............. G06F 13/1626 |
| | | | 710/53 |
| 2012/0239873 | A1* | 9/2012 | Huang ................ G06F 13/1626 |
| | | | 711/E12.001 |
| 2019/0196995 | A1* | 6/2019 | Shen ..................... G06F 3/0673 |
| 2020/0320021 | A1* | 10/2020 | Li ........................... G06F 9/546 |
| 2020/0401545 | A1* | 12/2020 | Shiraishi ............. G06F 13/4031 |

FOREIGN PATENT DOCUMENTS

| JP | 6237945 B1 | 11/2017 |
| JP | 2018136592 A | 8/2018 |

* cited by examiner

*Primary Examiner* — Charles Rones
*Assistant Examiner* — Ryan Dare
(74) *Attorney, Agent, or Firm* — Canon U.S.A., Inc., IP Division

(57) ABSTRACT

A memory controller configured to control a dynamic random access memory (DRAM) includes a first control circuit and a second control circuit. The first control circuit is configured to store a request received by the memory controller in a first storage circuit, and select a request from all requests stored in the first storage circuit. The second control circuit is configured to store the request selected by the first control circuit in a second storage circuit, reorder requests stored in the second storage circuit, generate a DRAM command, and issue the DRAM command to the DRAM. The first control circuit is configured to select the request based on target banks and target pages of the requests stored in the second storage circuit, and a state of a bank or page of the DRAM.

17 Claims, 11 Drawing Sheets

FIG.3A

FIRST STORAGE UNIT

| RD07 (0, 1) | RD06 (0, 1) | RD05 (1, 3) | RD04 (1, 0) | RD03 (0, 1) | RD02 (0, 2) |
|---|---|---|---|---|---|

SECOND STORAGE UNIT

| | | | | | | RD01 (0, 1) | RD00 (0, 2) |
|---|---|---|---|---|---|---|---|

FIG.3B

FIRST STORAGE UNIT

| RD07 (0, 1) | RD06 (0, 1) | RD05 (1, 3) | RD04 (1, 0) | | RD02 (0, 2) |
|---|---|---|---|---|---|

SECOND STORAGE UNIT

| | | | | | RD03 (0, 1) | RD01 (0, 1) | RD00 (0, 2) |
|---|---|---|---|---|---|---|---|

FIG.4A

FIRST STORAGE UNIT

| RD09 (0, 2) | RD08 (2, 2) | RD07 (1, 1) | RD04 (1, 3) | RD03 (1, 0) | RD01 (0, 2) |
|---|---|---|---|---|---|

SECOND STORAGE UNIT

| | | | | | | | RD06 (0, 1) |
|---|---|---|---|---|---|---|---|

FIG.4B

FIRST STORAGE UNIT

| RD09 (0, 2) | RD08 (2, 2) | RD07 (1, 1) | | RD03 (1, 0) | RD01 (0, 2) |
|---|---|---|---|---|---|

SECOND STORAGE UNIT

| | | | | | | RD04 (1, 3) | RD06 (0, 1) |
|---|---|---|---|---|---|---|---|

FIG.4C

FIRST STORAGE UNIT

| RD09 (0, 2) | | RD07 (1, 1) | RD04 (1, 3) | RD03 (1, 0) | RD01 (0, 2) |
|---|---|---|---|---|---|

SECOND STORAGE UNIT

| | | | | | | RD08 (2, 2) | RD06 (0, 1) |
|---|---|---|---|---|---|---|---|

FIG.7A

FIRST STORAGE UNIT

| RD16 (3, 0, 2) | RD15 (4, 2, 2) | RD14 (6, 1, 1) | RD13 (1, 1, 0) | RD12 (5, 1, 0) | RD11 (1, 1, 2) |
|---|---|---|---|---|---|

SECOND STORAGE UNIT

|  |  |  |  |  |  | RD10 (4, 1, 3) | RD09 (3, 1, 3) |
|---|---|---|---|---|---|---|---|

FIG.7B

FIRST STORAGE UNIT

| RD16 (3, 0, 2) | RD15 (4, 2, 2) | RD14 (6, 1, 1) | RD13 (1, 1, 0) |  | RD11 (1, 1, 2) |
|---|---|---|---|---|---|

SECOND STORAGE UNIT

|  |  |  |  |  | RD12 (5, 1, 0) | RD10 (4, 1, 3) | RD09 (3, 1, 3) |
|---|---|---|---|---|---|---|---|

MEMORY CONTROLLER TO PROCESS REQUESTS FOR DRAM, CONTROL METHOD FOR MEMORY CONTROLLER, AND STORAGE MEDIUM

BACKGROUND

Technical Field

One disclosed aspect of the embodiments relates to a memory controller, a control method of the memory controller, and a storage medium.

Description of the Related Art

A main memory unit of a computer system typically uses dynamic random access memories (DRAMs) as its memory devices. DRAMs have a large storage capacity per chip and are inexpensive for the same capacity compared to other memory devices. A large-capacity memory system can thus be constructed at low cost using DRAMs.

A DRAM includes a two-dimensional array of memory cells. Each row of the two-dimensionally arranged memory cells is referred to as a page. To access a memory cell, a page is initially designated to internally read information about all the memory cells constituting the single page.

Next, a column is designated to identify the memory cell to be accessed. The identified memory cell is then accessed. A DRAM includes a plurality of two-dimensional arrays of memory cells. Each of the two-dimensional arrays of memory cells is referred to as a bank. A bank address is used to designate a bank.

The state of an internally read page is referred to as open, and the state of an internally unread page as closed. To open a closed page, activation is performed with the page address specified. Conversely, to close an open page, precharge is performed. If there is already an open page and another page is to be opened, precharge is performed to close the open page and then activation is performed to open the intended page.

DRAMs are widely used at present. However, as the functionality and performance of computer systems improve, higher performance is being demanded of DRAMs. Memory controllers for controlling DRAMs are expected to maximize DRAM access performance.

Factors that lower the DRAM access performance include a page-miss, or an access to a closed page, and read-write switching. If a page-miss occurs in the presence of an open page, precharge is performed to close the open page before the intended page is opened by activation. This affects the access performance. To prevent such a drop in performance, many techniques have been discussed related to memory controllers for controlling DRAMs.

Among the discussed techniques is a reordering method, where DRAM access requests (hereinafter, referred to as requests) are reordered to minimize penalty occurring during a DRAM access (hereinafter, referred to as DRAM access penalty). By the reordering, the DRAM access penalty can be reduced to prevent a drop in access performance.

Japanese Patent No. 6237945 discusses a technique for issuing memory requests by providing a request buffer for storing requests and determining memory bank groups to issue the memory requests to based on the number of non-busy banks among the banks belonging to the memory bank groups.

However, the reordering method includes generating DRAM commands, such as an active, precharge, read, and write commands, from a request group in the request buffer in parallel for the sake of determining the DRAM access penalty and reordering the requests. This complicates the reordering logic circuit for implementing the reordering technique. An issue concerning the technique discussed in Japanese Patent No. 6237945 is an exponential increase in the area of the logic circuit for generating DRAM commands as the number of stages of the request buffer increases.

SUMMARY

An aspect of the embodiments is directed to providing a technique that can reduce the area of the reordering logic circuit for reordering requests.

A memory controller configured to control a dynamic random access memory (DRAM) includes a first control circuit and a second control circuit. The first control circuit is configured to store a request received by the memory controller in a first storage circuit, and select a request from all requests stored in the first storage circuit. The second control circuit is configured to store the request selected by the first control circuit in a second storage circuit, reorder requests stored in the second storage circuit, generate a DRAM command, and issue the DRAM command to the DRAM. The first control circuit is configured to select the request based on target banks and target pages of the requests stored in the second storage circuit, and a state of a bank or page of the DRAM.

Further features of the disclosure will become apparent from the following description of exemplary embodiments with reference to the attached drawings.

BRIEF DESCRIPTION OF THE DRAWINGS

FIGS. 3A and 3B are diagrams illustrating the first storage unit and a second storage unit.

FIGS. 4A to 4C are diagrams illustrating the first and second storage units.

FIGS. 7A and 7B are diagrams illustrating the first storage unit and a second storage unit.

DESCRIPTION OF THE EMBODIMENTS

Figure 1:
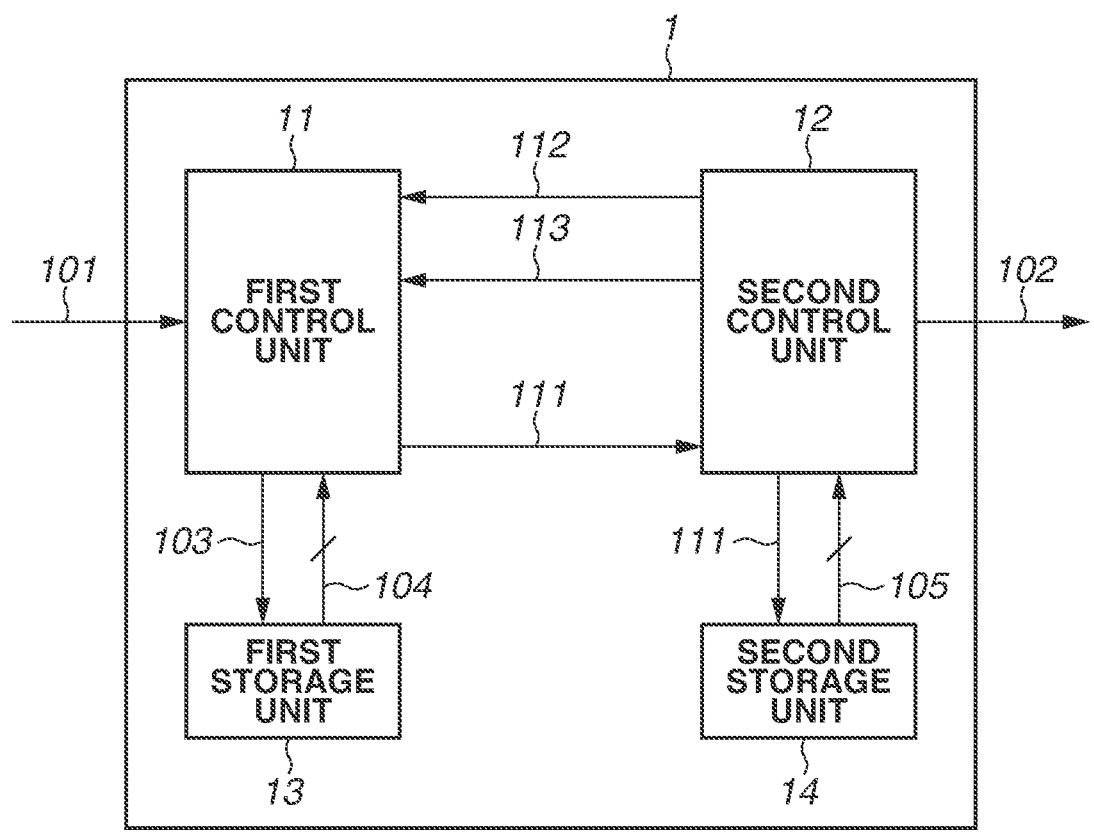
FIG. 1 is a diagram illustrating a configuration example of a memory controller.

Exemplary embodiments will be described below with reference to the attached drawings. However, modifications may be made to the exemplary embodiments and details thereof without departing from the gist and scope of the disclosure. The exemplary embodiments are therefore not limited to the following description. The following exemplary embodiments may be implemented by hardware or software unless otherwise specified. In principle, members having similar functions are denoted by the same reference numerals, and a redundant description thereof will be omitted. In the following, the term "unit" may be used to refer to a circuit, a logic device, a physical device, a processor, or a hardware elements. It may include logic elements such as AND-OR, and NOT elements implemented by transistor circuits or any other switching circuits. Typical combinational logic functions may be implemented by switching circuits such as multiplexers (to implement select functions), encoders, and decoders.

A dynamic random access memory (DRAM) includes a two-dimensional array of memory cells. Each row of the two-dimensionally arranged memory cells is referred to as a page. To access a memory cell, a page is initially designated to internally read information about all the memory cells constituting the single page.

Next, a column is designated to identify the memory cell to be accessed. The identified memory cell is then accessed. A DRAM includes a plurality of two-dimensional arrays of memory cells. Each of the two-dimensional arrays of memory cells is referred to as a bank. A bank address is used to designate a bank.

The state of an internally read page is referred to as open, and the state of an internally unread page as closed. To open a closed page, activation is performed with the page address specified. Conversely, to close an open page, precharge is performed. If there is already an open page and another page is to be opened, precharge is performed to close the open page and then activation is performed to open the intended page.

A bank for which a request is targeted will hereinafter be referred to for short as a target bank. A page for which a request is targeted will hereinafter be referred to for short as a target page. A bank designated by a bank address b will be referred to for short as bank b, and a page designated by a page address p as page p.

FIG. 1 is a diagram illustrating a configuration example of a memory controller 1 according to a first exemplary embodiment. The memory controller 1 controls a DRAM. The memory controller 1 includes at least a first control unit or circuit 11, a second control unit or circuit 12, a first storage unit or circuit 13, and a second storage unit or circuit 14. Main functions and characteristics of the functional units or circuits constituting the memory controller 1 will be described below. A storage circuit or unit may be implemented by capacitors, logic elements such as flip-flops, etc.

The first control unit 11 assigns an identifier (ID) to a received request 101 and stores the resulting IDed request 103 in the first storage unit 13. The first control unit 11 selects a request satisfying a condition from all in-first-storage-unit requests 104 stored in the first storage unit 13, and transmits the selected request 111 to the second control unit 12.

The second control unit 12 stores the received request 111 in the second storage unit 14. The second control unit 12 reorders in-second-storage-unit requests 105 stored in the second storage unit 14 to reduce DRAM access penalty, and generates a DRAM command 102. The second control unit 12 also generates target bank and target page information 112 about the in-second-storage-unit requests 105 based on the in-second-storage-unit requests 105 stored in the storage unit 14, and transmits the target bank and target page information 112 to the first control unit 11. The second control unit 12 also manages an execution state of the DRAM command 102. The second control unit 12 generates DRAM bank and page states 113 based on the managed execution state of the DRAM command 102, and transmits the DRAM bank and page states 113 to the first control unit 11.

The first storage unit 13 stores IDed requests 103 generated by the first control unit 11 assigning IDs to received requests 101. All the entries in the first storage unit 13 can be read in parallel by the first control unit 11.

The second storage unit 14 stores requests 111 received by the second control unit 12. The entry numbers of the requests 111 stored in the second storage unit 14 indicate the order of storage of the requests 111. Specifically, the newer a stored request 111, the greater the entry number of the entry where the request 111 is stored. All the entries in the second storage unit 14 can be read in parallel by the second control unit 12.

Next, an operation of the first control unit 11 will be described. Receiving a request 101, the first control unit 11 assigns the received request 101 an ID for the memory controller 1 to identify the request by. The first control unit 11 then stores the ID-assigned, IDed request 103 in the first storage unit 13. In the first exemplary embodiment, the first control unit 11 assigns IDs in the format of <request type><request number>. The format may be implemented by a predefined bit pattern including a combinations of logical zeros and ones.

<request type> indicates the type of request. In the first exemplary embodiment, there are two possible values of <request type>, RD and WR. An RD request is to perform an operation for reading data from the DRAM. A WR request is to perform an operation for writing data to the DRAM. <request type> is not limited to the foregoing two and may be freely set.

<request number> is a code for uniquely identifying the request and indicating the order of reception. <request number> may be in any format as long as the request can be uniquely identified and the order of reception can be indicated.

Next, a procedure where the first control unit 11 according to the first exemplary embodiment selects a request satisfying a condition from the in-first-storage-unit requests 104 stored in the first storage unit 13 will be described in detail.

Initially, the target bank and target page information 112 about the in-second-storage-unit requests 105 and the DRAM bank and page states 113 to be used in the step of selecting a request satisfying a condition will be described.

The target bank and target page information 112 about the in-second-storage-unit requests 105 indicates the target banks and target pages of the requests stored in the second storage unit 14. The second control unit 12 generates the target bank and target page information 112 about the in-second-storage-unit requests 105 from information about the in-second-storage-unit request 105 stored in the second storage unit 14, and transmits the target bank and target page information 112 to the first control unit 11. In selecting a request satisfying a condition, the first control unit 11 desirably refers to the target banks and target pages of all the requests stored in the second storage unit 14 collectively at a time. In the first exemplary embodiment, if the number of entries in the second storage unit 14 is n, the target bank and target page information 112 about the in-second-storage-unit requests 105 is expressed in the format of a two-row n-column vector given by the following Exp. (1):

$$\begin{pmatrix} \text{entry 0 request} & \text{entry 1 request} & \cdots & \text{entry } (n-1) \text{ request} \\ \text{target bank} & \text{target bank} & & \text{target bank} \\ \text{entry 0 request} & \text{entry 1 request} & \cdots & \text{entry } (n-1) \text{ request} \\ \text{target page} & \text{target page} & & \text{target page} \end{pmatrix} \quad (1)$$

The two-row n-column vector format enables the first control unit 11 to refer to the target banks and target pages of all the requests stored in the second storage unit 14 collectively at a time. Since the entry number indicates the order of storage of the selected request 111 in the second storage unit 14, the target banks and the target pages with greater column numbers represent those of newer requests.

Next, the DRAM bank and page states 113 will be described. The DRAM bank and page states 113 indicate the states of the respective banks and pages of the DRAM connected to the memory controller 1. The second control unit 12 manages the execution state of the DRAM command 102. The second control unit 12 generates the DRAM bank and page states 113 based on the managed execution state, and transmits the DRAM bank and page states 113 to the first control unit 11. In selecting a request satisfying a condition, the first control unit 11 refers to the following information about the DRAM bank and page states 113 of all the banks of the DRAM connected to the memory controller 1 bank by bank:

a) Whether the bank includes an open page;
b) If the bank includes an open page, the page address of the open page; and
c) DRAM commands issuable to the bank.

If the number of banks of the DRAM connected to the memory controller 1 is k, the DRAM bank and page states 113 are expressed in the format of a k-row three-column vector given by the following Exp. (2):

$$\begin{Bmatrix} \text{state of bank 0} & \text{page address} & \text{DRAM commands issuable to bank 0} \\ \text{state of bank 1} & \text{page address} & \text{DRAM commands issuable to bank 1} \\ \vdots & \vdots & \vdots \\ \text{state of bank } (k-1) & \text{page address} & \text{DRAM commands issuable to bank } (k-1) \end{Bmatrix} \quad (2)$$

The k-row three-column vector format enables the first control unit 11 to refer to the information about all the banks of the DRAM connected to the memory controller 1 collectively at a time.

Conditions (a) to (c) based on which the first control unit 11 selects a request from the in-first-storage-unit requests 104 are as follows:

(a) The request is an in-first-storage-unit request 104 stored in the first storage unit 13, and
the target bank and the target page of the in-first-storage-unit request 104 agree with those of an in-second-storage-unit request 105 residing in the second storage unit 14 for a shortest time among in-second-storage-unit requests 105 having the same target bank, stored in the second storage unit 14;
(b) The request is an in-first-storage-unit request 104 stored in the first storage unit 13,
the target bank of the in-first-storage-unit request 104 does not agree with that of any of the in-second-storage-unit requests 105 stored in the second storage unit 14,
the target page of the in-first-storage-unit request 104 is open, and
a precharge command is issuable to the target page of the in-first-storage-unit request 104; and
(c) The request is an in-first-storage-unit request 104 stored in the first storage unit 13,
the target bank of the in-first-storage-unit request 104 does not agree with that of any of the in-second storage requests 105 stored in the second storage unit 14,
the target page of the in-first-storage-unit request 104 is closed, and
an active command is issuable to the target page of the in-first-storage-unit request 104.

In a given target bank, there is either a request satisfying one of conditions (a) to (c) or no request satisfying any of conditions (a) to (c). Between different target banks, there can simultaneously be requests satisfying conditions (a) to (c).

In the present exemplary embodiment, the first control unit 11 therefore selects a request from the in-first-storage-unit requests 104 in the following manner based on DRAM access penalty.

A request satisfying condition (a) does not cause a page-miss since the target bank and the target page agree with those of one of the requests in the second storage unit 14. The request thus incurs the smallest DRAM access penalty among requests satisfying conditions (a), (b), and (c).

A request satisfying condition (b) causes a page-miss since the target banks do not agree. However, there is no penalty for waiting for the issuance of a page control command since a precharge command can be immediately issued. The DRAM access penalty on the request satisfying condition (b) is higher than that on the request satisfying condition (a) as much as the issuance of the precharge command. However, the DRAM access penalty on the request satisfying condition (b) is lower than that on a request involving a wait for the issuance of a page control command.

Similarly, a request satisfying condition (c) causes a page-miss since the target banks do not agree. However, the DRAM access penalty on the request satisfying condition (c) is lower than that on a request involving a wait for the issuance of a page control command since an active command can be immediately issued.

In the first exemplary embodiment, the first control unit 11, when selecting a request from the in-first-storage-unit requests 104, therefore selects a request satisfying condition (a) by the highest priority. If there is no request satisfying condition (a), the first control unit 11 then selects a request satisfying condition (b). If there is no request satisfying condition (a) or (b), the first control unit 11 lastly selects a request satisfying condition (c).

Figure 2:
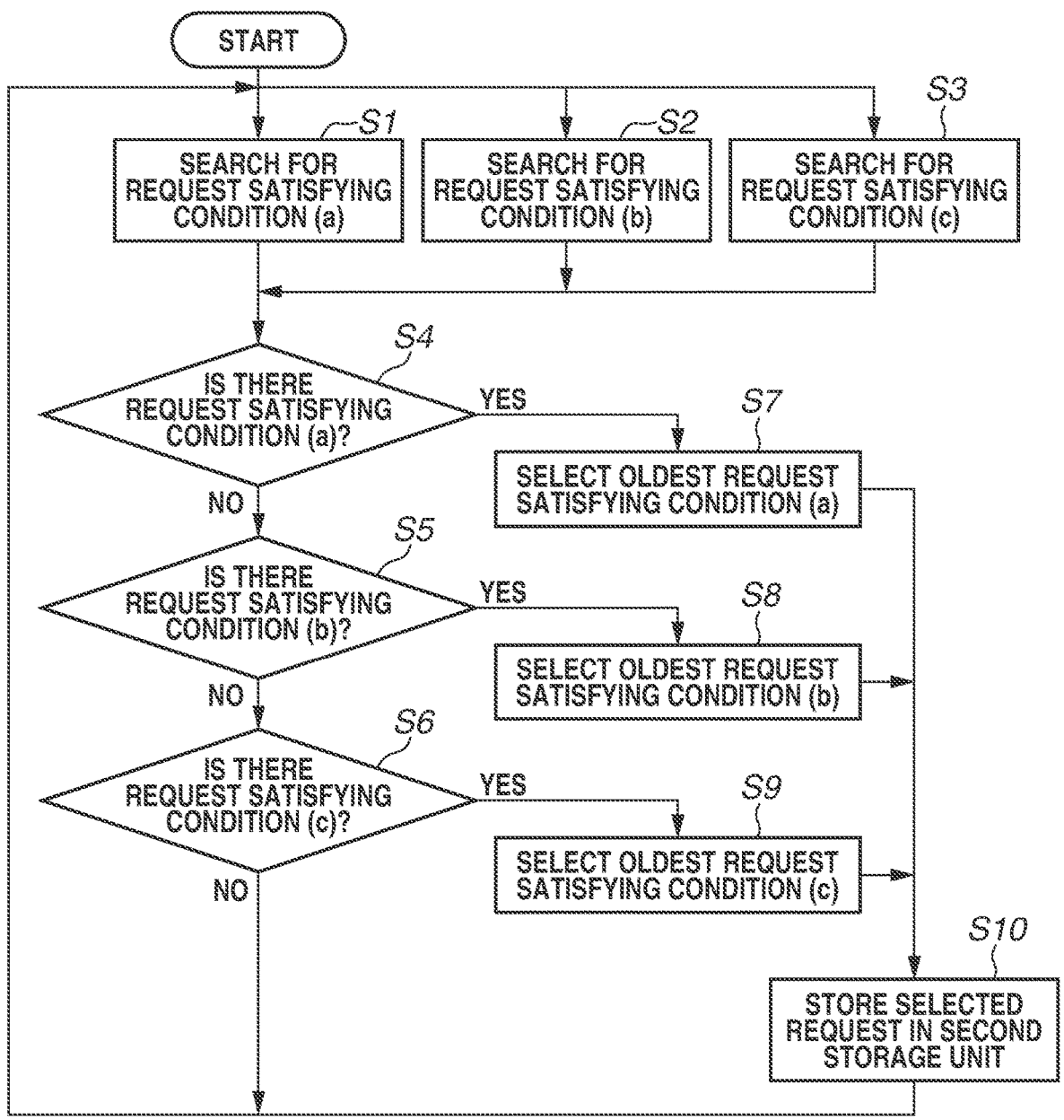
FIG. 2 is a flowchart illustrating a procedure for selecting a request from a first storage unit.

Next, the operation by which the first control unit 11 selects a request from the in-first-storage-unit requests 104 will be described in more detail with reference to the flowchart of FIG. 2. FIG. 2 is a flowchart illustrating an example of a control method of the memory controller 1. In FIG. 2, steps S1 to S10 represent steps to be performed in selecting a request.

In FIG. 2, steps S1, S2, and S3 are steps of searching the first storage unit 13 for a request satisfying the foregoing conditions (a), (b), and (c), respectively. As illustrated in FIG. 2, in the first exemplary embodiment, the first control unit 11 searches the first storage unit 13 for requests satisfying conditions (a), (b), and (c) in parallel by performing steps S1, S2, and S3 in parallel.

Next, step S1 will be described. In step S1, the first control unit 11 selects and extracts a request satisfying condition (a) from the in-first-storage-unit requests 104 stored in the first storage unit 13. From the foregoing definition of condition (a), a request satisfying condition (a) has the same target bank and target page as those of one of the requests in the second storage unit 14. The first control unit 11 thus compares the target banks and target pages of the in-first-storage-unit requests 104 with those indicated by the target bank and target page information 112 about the in-second-storage-unit requests 105. Now, a case where there is a plurality of requests having the same target bank in the second storage unit 14 will be described. In such a case, the first control unit 11 compares the target banks and target pages of the in-first-storage-unit requests 104 with those of the newest of the requests, i.e., one of which the column number in the target bank and target page information 112 about the in-second-storage-unit requests 105 is the greatest. The first control unit 11 then searches for and extracts a request of which both the target bank and the target page agree. Here, the first control unit 11 may extract a plurality of requests satisfying condition (a).

Next, step S2 will be described. In step S2, the first control unit 11 selects and extracts a request satisfying condition (b) from the in-first-storage-unit requests 104 stored in the first storage unit 13. From the foregoing definition of condition (b), the first control unit 11 also uses the DRAM bank and page states 113 in searching for a request. In step S2, the first control unit 11 searches for and extracts a request satisfying condition (b) by two procedures A and B to be described below. Here, the first control unit 11 may extract a plurality of requests satisfying condition (b).

In procedure A, the first control unit 11 compares the target banks of the in-first-storage-unit requests 104 with those indicated by the target bank and target page information 112 about the in-second-storage-unit requests 105, and extracts requests of which the target banks do not agree.

In procedure B, the first control unit 11 searches the DRAM bank and page states 113 based on the target banks and target pages of the requests extracted by procedure A, and extracts a request of which the page is open and capable of precharge.

Next, step S3 will be described. In step S3, the first control unit 11 selects and extracts a request satisfying condition (c) from the in-first-storage-unit requests 104 stored in the first storage unit 13. From the foregoing definition of condition (c), like step S2, the first control unit 11 also uses the DRAM bank and page states 113 in searching for a request. In step S3, the first control unit 11 searches for and extracts a request satisfying condition (c) by two procedures C and D to be described below. Here, the first control unit 11 may extract a plurality of requests satisfying condition (c).

In procedure C, the first control unit 11 compares the target banks of the in-first-storage-unit requests 104 with those indicated by the target bank and target page information 112 about the in-second-storage-unit requests 105, and extracts requests of which the target banks do not agree.

In procedure D, the first control unit 11 searches the DRAM bank and page states 113 based on the target banks and target pages of the requests extracted by procedure C, and extracts a request of which the target page is closed and capable of activation.

In step S4, if there is a request satisfying condition (a) in the first storage unit 13 (YES in step S4), the processing proceeds to step S7. If there is no request satisfying condition (a) in the first storage unit 13 (NO in step S4), the processing proceeds to step S5.

In step S5, if there is a request satisfying condition (b) in the first storage unit 13 (YES in step S5), the processing proceeds to step S8. If there is no request satisfying condition (b) in the first storage unit 13 (NO in step S5), the processing proceeds to step S6.

In step S6, if there is a request satisfying condition (c) in the first storage unit 13 (YES in step S6), the processing proceeds to step S9. If there is no request satisfying condition (c) in the first storage unit 13 (NO in step S6), the processing returns to steps S1 to S3.

In step S7, the first control unit 11 selects the oldest request satisfying condition (a) in the first storage unit 13 as the request 111, using <request number> in the IDs assigned by the first control unit 11. The processing proceeds to step S10. <request number> in the IDs indicates the order of reception of the requests.

In step S8, the first control unit 11 selects the oldest request satisfying condition (b) in the first storage unit 13 as the request 111, using <request number> in the IDs assigned by the first control unit 11. The processing proceeds to step S10.

In step S9, the first control unit 11 selects the oldest request satisfying condition (c) in the first storage unit 13 as the request 111, using <request number> in the IDs assigned by the first control unit 11. The processing proceeds to step S10.

In step S10, if there is an empty entry in the second storage unit 14, the first control unit 11 transmits the selected request 111 to the second control unit 12. The processing returns to steps S1 to S3. The second control unit 12 stores the request 111 in the empty entry in the second storage unit 14. If there is no empty entry in the second storage unit 14, the processing returns to steps S1 to S3 without transmitting the request 111.

Next, an operation of the second control unit 12 will be described. The second control unit 12 receives the selected request 111 transmitted by the first control unit 11, and stores the request 111 in the second storage unit 14.

Moreover, the second control unit 12 reorders the in-second-storage-unit requests 105 stored in the second storage unit 14 to reduce DRAM access penalty, and generates a DRAM command 102. The second control unit 12 then issues the DRAM command 102 to the DRAM. The second control unit 12 reorders the in-second-storage-unit requests 105 to minimize the DRAM access penalty. By the reordering, the DRAM access penalty is reduced to prevent a drop in access performance.

The selected request 111 transmitted by the first control unit 11 satisfies condition (a), (b), or (c). In other words, the selected request 111 is one which does not cause a page-miss, or which causes a page-miss but where a precharge or active command can be immediately issued. All the requests stored in the second storage unit 14 are therefore ones where a precharge or active command can be immediately issued even in the event of a page-miss, and can thus be reordered.

Moreover, the second control unit 12 extracts the target banks and target pages of the in-second-storage-unit requests 105 stored in the second storage unit 14 entry by entry, and generates the target bank and target page information 112 about the in-second-storage-unit requests 105. The second control unit 12 then transmits the generated target bank and target page information 112 about the in-second-storage-unit requests 105 to the first control unit 11.

To generate the DRAM bank and page states 113, the second control unit 12 further manages at least the execution state of the DRAM command 102 and DRAM bank and page states as follows:
  (a) Type of issued DRAM command;
  (b) Elapsed time from the issuance of the DRAM command; and
  (c) Page address of an open page in each bank.

It will be understood that the execution state of the DRAM command 102 and the DRAM bank and page states to be managed by the second control unit 12 are not limited to the foregoing three states (a) to (c). The present exemplary embodiment does not depend on the technique for managing the execution state of the DRAM command 102 and the DRAM bank and page states, either. Conventional techniques may therefore be used for management.

The second control unit 12 generates the DRAM bank and page states 113 from the execution state of the DRAM command 102 and the DRAM bank and page states mentioned above, and transmits the DRAM bank and page states 113 to the first control unit 11. Of the elements of the DRAM bank and page states 113, the states of the banks and the page addresses of open pages are generated from the foregoing state (c), i.e., the page address of an open page in each bank. The DRAM commands issuable to each bank are generated by selecting an issuable DRAM command or commands based on state (a), i.e., the type of issued DRAM command, state (b), i.e., the elapsed time from the issuance of the DRAM command, and DRAM operation specifications.

Next, the first storage unit 13 will be described. The first storage unit 13 stores IDed requests 103 that are requests 101 received by the first control unit 11 and assigned IDs. The first storage unit 13 may have any physical structure and any logical structure as long as both of the following conditions (d) and (e) are satisfied:
 (d) Information about the stored requests, including the IDs, can be obtained from all the entries in parallel; and
 (e) The request stored in each entry can be read from the entry.

In other words, the first storage unit 13 may have either a queue structure or a buffer structure.

The first storage unit 13 may include any element as long as specification requirements for the memory controller 1, such as speed and power consumption, are satisfied. Specifically, a static random access memory (SRAM) or a flip-flop (F/F) may be applied as an element constituting the first storage unit 13.

Next, the second storage unit 14 will be described. The second storage unit 14 stores the selected request 111 selected and transmitted by the first control unit 11. Like the first storage unit 13, the second storage unit 14 may have any structure as long as both of the following conditions (f) and (g) are satisfied:
 (f) Information about the stored requests can be obtained from all the entries in parallel; and
 (g) The request stored in each entry can be read from the entry.

Like the first storage unit 13, the second storage unit 14 may include an SRAM or F/Fs as long as the specification requirements for the memory controller 1, such as speed and power consumption, are satisfied.

Next, an operation according to the first exemplary embodiment will be described with reference to FIGS. 3A, 3B, and 4A to 4C as well, with a focus on the operation of the first control unit 11, the first storage unit 13, and the second storage unit 14. In the following description, the number of entries in the first storage unit 13 is six (m=6), and the number of entries in the second storage unit 14 is eight (n=8).

The notation used in FIGS. 3A, 3B, and 4A to 4C will initially be described. In FIGS. 3A and 3B, or 4A to 4C, requests are expressed in the following format:
<request type><request number> (target bank, target page).
 <request type> is an element constituting an ID, with the following two possible values:
  RD: a request to perform an operation for reading data from the DRAM; and
  WR: a request to perform an operation for writing data to the DRAM.

<request number> is a code for uniquely identifying the request and indicating the order of reception. <request number> may be in any format as long as requests can be uniquely identified and the order of reception can be indicated.

For example, RD01 (0, 2) represents a request with <request type> of RD and <request number> of 01 and where the target bank is bank 0 and the target page is page 2, i.e., a request to perform an operation for reading data from page 2 in bank 0 of the DRAM. <request number> of RD01 (0, 2) is 01, which indicates that this request is received subsequent to a request with <request number> of 00.

Next, an operation where the first control unit 11 selects a request satisfying condition (a) to an operation where the second control unit 12 stores the selected request 111 in the second storage unit 14 will be described with reference to FIGS. 3A and 3B.

FIG. 3A illustrates the states of the first storage unit 13 and the second storage unit 14 at a certain time.

All the six entries in the first storage unit 13 illustrated in FIG. 3A contain requests.

The second storage unit 14 stores two requests. The two requests stored in the second storage unit 14 are RD00 (0, 2) and RD01 (0, 1). Here, the time of residence of the request RD01 (0, 1) in the second storage unit 14 is shorter than that of RD00 (0, 2).

Based on the definition of condition (a), if there is a plurality of requests having the same target bank in the second storage unit 14, a request residing in the second storage unit 14 for a shortest time is subjected to comparison in selecting a request satisfying condition (a). In the foregoing example, both RD00 (0, 2) and RD01 (0, 1) are requests with bank 0 as the target bank, and RD01 (0, 1) residing in the second storage unit 14 for the shortest time is thus subjected to comparison. In other words, the target bank is bank 0, and the target page is page 1.

In step S1 of extracting a request satisfying condition (a) in FIG. 2, the first control unit 11 thus extracts the following three requests where the target bank is bank 0 and the target page is page 1 from the in-first-storage-unit requests 104:
 RD03 (0, 1), RD06 (0, 1), and RD07 (0, 1).

Next, in step S4, the first control unit 11 determines that there is a request satisfying condition (a), and the processing proceeds to step S7. In step S7, the first control unit 11 selects RD03 (0, 1) that is the oldest of the foregoing three requests. In step S10, if there is an empty entry in the second storage unit 14, the first control unit 11 transmits the selected RD03 (0, 1) to the second control unit 12.

The second control unit 12 receives RD03 (0, 1) transmitted from the first control unit 11, and stores RD03 (0, 1) in the second storage unit 14. The first control unit 11 deletes RD03 (0, 1) from the first storage unit 13. FIG. 3B illustrates the states of the first and second storage units 13 and 14 after the completion of the series of operations. As illustrated in FIG. 3B, RD00 (0, 2), RD01 (0, 1), and RD03 (0, 1) all with bank 0 as the target bank reside in the second storage unit 14. RD01 (0, 1) and RD03 (0, 1) have the same target bank and the same target page, and thus do not cause a page-miss or DRAM access penalty.

Next, a case where condition (b) holds will be described with reference to FIGS. 4A to 4C. FIG. 4A illustrates the states of the first and second storage units 13 and 14 at a certain time. Since the request stored in the second storage unit 14 is RD06 (0, 1), the target bank is bank 0 and the target page is page 1.

The in-first-storage-unit requests 104 illustrated in FIG. 4A do not include a request where the target bank is bank 0 and the target page is page 1. There is therefore no request satisfying condition (a) in the first storage unit 13. Meanwhile, there are the following four requests where the target bank is different from that of RD06 (0, 1) in the first storage unit 13:

RD03 (1, 0), RD04 (1, 3), RD07 (1, 1), and RD08 (2, 2).

Suppose that the DRAM bank and page states 113 have values expressed by the following Exp. (3):

$$\begin{pmatrix} \text{state of bank 0:CLOSED} & - & \text{active} \\ \text{state of bank 1:OPEN} & 3 & \text{precharge} \\ \text{state of bank 2:OPEN} & 1 & \text{precharge} \\ \text{state of bank 3:CLOSED} & - & - \\ \vdots & \vdots & \vdots \end{pmatrix} \quad (3)$$

The banks of the foregoing four requests are either bank 1 or bank 2. The first control unit 11 then searches Exp. (3) for the states of banks 1 and 2. Bank 1 is in a state where page 3 is open and capable of precharge. Bank 2 is in a state where page 1 is open and capable of precharge.

Of the foregoing four requests, RD04 (1, 3) is where the target page is open and capable of precharge, and thus satisfies condition (b). The other requests RD03 (1, 0), RD07 (1, 1), and RD08 (2, 2) do not satisfy condition (b). In step S2 of extracting a request satisfying condition (b) in FIG. 2, the first control unit 11 therefore extracts the request RD04 (1, 3).

Next, in step S4, the first control unit 11 determines whether there is a request satisfying condition (a). Since there is no request satisfying condition (a) as described above, the processing proceeds to step S5. In step S5, the first control unit 11 determines whether there is a request satisfying condition (b). Since there is a request satisfying condition (b), the processing proceeds to step S8. In step S8, the first control unit 11 selects RD04 (1, 3) since RD04 (1, 3) is the only request satisfying condition (b). In step S10, if there is an empty entry in the second storage unit 14, the first control unit 11 transmits the selected RD04 (1, 3) to the second control unit 12. The second control unit 12 receives RD04 (1, 3) transmitted from the first control unit 11, and stores RD04 (1, 3) in the second storage unit 14. The first control unit 11 deletes RD04 (1, 3) from the first storage unit 13. FIG. 4B illustrates the states of the first and second storage units 13 and 14 after the completion of the series of operations. As illustrated in FIG. 4B, RD06 (0, 1) and RD04 (1, 3) reside in the second storage unit 14. RD06 (0, 1) and RD04 (1, 3) cause a page-miss since their target banks are different. However, RD04 (1, 3) causes no DRAM access penalty related to page control since precharge can be performed. The total DRAM access penalty can thus be reduced.

Lastly, an operation in a case where condition (c) holds will be described, again with reference to FIGS. 4A to 4C. Like the description of the operation with condition (b), suppose that the states of the first and second storage units 13 and 14 at a certain time are as illustrated in FIG. 4A. The second storage unit 14 stores only RD06 (0, 1) where the target bank is bank 0 and the target page is page 1. There is therefore no request satisfying condition (a) in the first storage unit 13. There are the following four requests where the target bank is different from that of RD06 (0, 1) in the first storage unit 13:

RD03 (1, 0), RD04 (1, 3), RD07 (1, 1), and RD08 (2, 2).

Suppose here that the DRAM bank and page states 113 have values expressed by the following Exp. (4):

$$\begin{pmatrix} \text{state of bank 0:CLOSED} & - & \text{active} \\ \text{state of bank 1:OPEN} & 3 & - \\ \text{state of bank 2:CLOSED} & - & \text{active} \\ \text{state of bank 3:CLOSED} & - & - \\ \vdots & \vdots & \vdots \end{pmatrix} \quad (4)$$

The banks of the foregoing four requests are either bank 1 or bank 2. The first control unit 11 then searches Exp. (4) for the states of banks 1 and 2. Bank 1 is in a state where page 3 is open and capable of neither precharge nor activation. Bank 2 is in a state where all the pages are closed and capable of activation.

In bank 1, page 3 is open but not capable of precharge. In bank 2, all the pages are closed. There is therefore no request satisfying condition (b) in the first storage unit 13. Meanwhile, all the pages in bank 2 are closed and capable of activation. RD08 (2, 2) with bank 2 as the target bank thus satisfies condition (c). In step S3 of extracting a request satisfying condition (c) in FIG. 2, the first control unit 11 therefore extracts RD08 (2, 2).

Next, in steps S4 and S5, the first control unit 11 determines whether there is a request satisfying condition (a) and whether there is a request satisfying condition (b), respectively. Since there is no request satisfying condition (a) nor condition (b) as described above, neither of the determination conditions in steps S4 and S5 holds, and the processing proceeds to step S6. In step S6, the first control unit 11 determines whether there is a request satisfying condition (c). Since RD08 (2, 2) that is a request satisfying condition (c) is extracted by the first control unit 11 in step S3, there is a request satisfying condition (c) and the processing proceeds to step S9. In step S9, the first control unit 11 selects RD08 (2, 2) since RD08 (2, 2) is the only request satisfying condition (c). In step S10, if there is an empty entry in the second storage unit 14, the first control unit 11 transmits the selected RD08 (2, 2) to the second control unit 12. The second control unit 12 receives RD08 (2, 2) transmitted from the first control unit 11, and stores RD08 (2, 2) in the second storage unit 14. The first control unit 11 deletes RD08 (2, 2) from the first storage unit 13. FIG. 4C illustrates the states of the first and second storage units 13 and 14 after the completion of the series of operations. As illustrated in FIG. 4C, RD06 (0, 1) and RD08 (2, 2) reside in the second storage unit 14. RD06 (0, 1) and RD08 (2, 2) cause a page-miss since their target banks are different. However, RD08 (2, 2) causes no DRAM access penalty related to page control since precharge can be performed. The total DRAM access penalty can thus be reduced.

Next, a second exemplary embodiment will be described. In the second exemplary embodiment, requests 101 have priority levels as to issuance of requests to a DRAM. The priority levels are given by a functional unit that issues the requests 101, such as a central processing unit (CPU), in issuing the requests 101. In the second exemplary embodiment, there are eight priority levels ranging from 0 that is the lowest to 7 that is the highest. The definition of the priority levels is not limited thereto.

Figure 5:
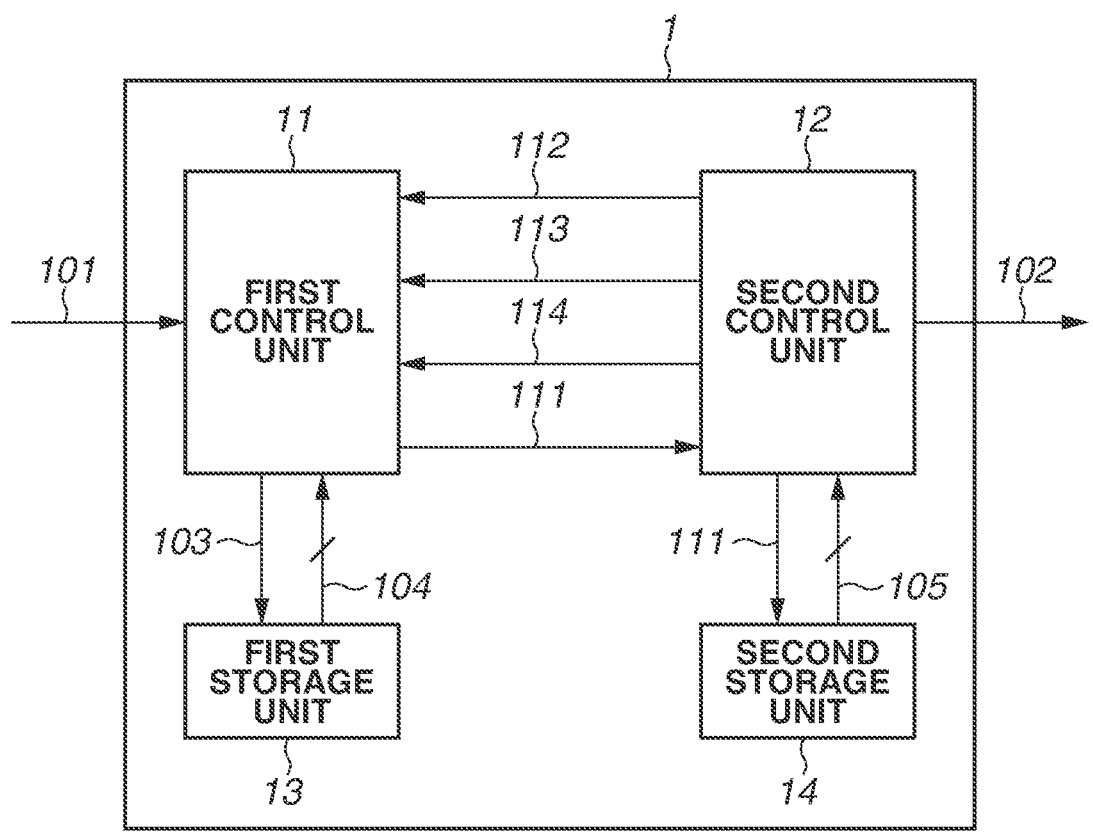
FIG. 5 is a diagram illustrating a configuration example of a memory controller.

FIG. 5 is a diagram illustrating a configuration example of a memory controller 1 according to the second exemplary embodiment. Like the memory controller 1 illustrated in FIG. 1, the memory controller 1 illustrated in FIG. 5 includes at least a first control unit 11, a second control unit 12, a first storage unit 13, and a second storage unit 14. Hereinafter, functions related to the second exemplary embodiment will be mainly described. A description of functions similar to those of the first exemplary embodiment will be omitted.

The first control unit 11 uses the foregoing priority levels as a condition in selecting a condition-satisfying request from in-first-storage-unit requests 104 stored in the first storage unit 13. For that purpose, the first control unit 11 refers to the priority levels of requests stored in the second storage unit 14. The second control unit 12 thus generates priority levels 114 of in-second-storage-unit requests 105 stored in the second storage unit 14 from information about the in-second-storage-unit requests 105, and transmits the priority levels 114 to the first control unit 11. In the second exemplary embodiment, if the number of entries in the second storage unit 14 is n, the priority levels 114 of the in-second-storage-unit requests 105 are expressed in the format of a one-row n-column vector given by the following Exp. (5):

$$\begin{pmatrix} \text{entry 0 request} & \text{entry 1 request} & \cdots & \text{entry } (n-1) \text{ request} \\ \text{priority level} & \text{priority level} & & \text{priority level} \end{pmatrix}. \quad (5)$$

The one-row n-column vector format enables the first control unit 11 to refer to the priority levels of all the requests stored in the second storage unit 14 collectively at a time. Moreover, since the entry numbers indicate the order of storage of the selected requests 111 in the second storage unit 14, the priority levels with greater column numbers in Exp. (5) indicate the priority levels of newer requests.

Conditions (a) to (d) based on which the first control unit 11 according to the second exemplary embodiment selects a request from the in-first-storage-unit requests 104 will now be described. Conditions (a) to (c) according to the second exemplary embodiment are the same as conditions (a) to (c) according to the first exemplary embodiment. Condition (d) will therefore be mainly described:

(d) The request is an in-first-storage-unit request 104 stored in the first storage unit 13, the target bank of the in-first-storage-unit request 104 agrees with that of one of the in-second-storage-unit requests 105 stored in the second storage unit 14, the target page of the in-first-storage-unit request 104 does not agree with that of an in-second-storage-unit request 105 residing in the second storage unit 14 for a shortest time among in-second-storage-unit requests 105 of which the target banks agree with that of the in-first-storage-unit request 104, and the priority level of the in-first-storage-unit request 104 is higher than that of the in-second-storage-unit request 105 residing in the second storage unit 14 for the shortest time among the in-second-storage-unit request 105 of which the target banks agree with that of the in-first-storage-unit request 104.

Like the first exemplary embodiment, in a given target bank, there is either a request satisfying one of conditions (a) to (d) or no request satisfying any of conditions (a) to (d). Between different target banks, there can simultaneously be requests satisfying conditions (a) to (d).

Condition (d) takes into account the priority levels. In the second exemplary embodiment, the first control unit 11, when selecting a request from the in-first-storage-unit requests 104, selects a request satisfying condition (d) by the highest priority. The first control unit 11 then selects a request satisfying condition (a), a request satisfying condition (b), and lastly a request satisfying condition (c) like the first exemplary embodiment.

Figure 6:
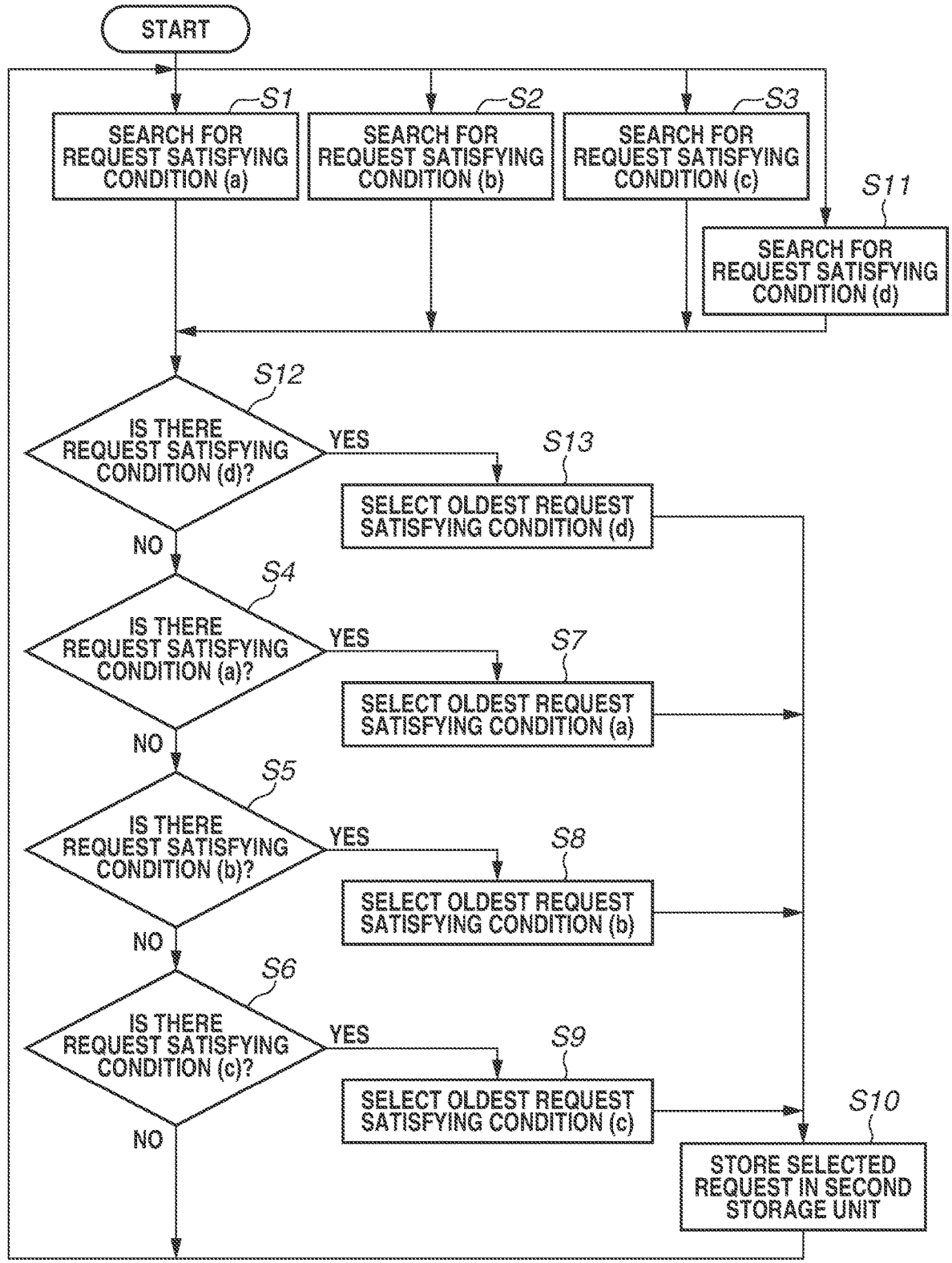
FIG. 6 is a flowchart illustrating a procedure for selecting a request from a first storage unit.

Next, the operation by which the first control unit 11 according to the second exemplary embodiment selects a request from the in-first-storage-unit requests 104 will be described in more detail with reference to the flowchart of FIG. 6. Steps S1 to S10 of FIG. 6 are similar to those of FIG. 2. In FIG. 6, steps S11 to S13 are added to the steps of FIG. 2. Steps S11 to S13 will therefore be mainly described. In the following description, the number of entries in the first storage unit 13 is m.

In step S11, the first control unit 11 selects and extracts a request satisfying condition (d) from the in-first-storage-unit requests 104 stored in the first storage unit 13 along with steps S1 to S3. From the definition of condition (d), the first control unit 11 here selects a request satisfying condition (d) by using the priority levels 114 of the in-second-storage-unit requests 105 as well. In step S11, the first control unit 11 searches for and extracts a request satisfying condition (d) by three procedures E, F, and G to be described below. Here, the first control unit 11 may extract a plurality of requests satisfying condition (d).

In procedure E, the first control unit 11 compares the target banks of the in-first-storage-unit requests 104 with those indicated by the target bank and target page information 112 about the in-second-storage-unit requests 105, and extracts requests of which the target banks agree. Here, an in-first-storage-unit request 104 of which the target bank agrees will be denoted by REQ1(p) {p|0≤p≤m}. A request residing in the second storage unit 14 for a shortest time among target bank-agreeing requests in the second storage unit 14 will be denoted by REQ2.

In procedure F, the first control unit 11 compares the target pages of REQ1(p) with that of REQ2 to extract a request of which the target page does not agree. The extraction result of procedure F will be denoted by PAGEMISSREQ1(r) {r|0≤r≤p}. There may be a plurality of PAGEMISSREQ1(r).

In procedure G, the first control unit 11 compares the priority level of PAGEMISSREQ1(r) with that of REQ2. If the priority of PAGEMISSREQ1(r) is higher than that of REQ2, the first control unit 11 determines that PAGEMISSREQ1(r) satisfies condition (d). On the other hand, if the priority level of PAGEMISSREQ1(r) is lower than or equal to that of REQ2, the first control unit 11 determines that PAGEMISSREQ1(r) does not satisfy condition (d).

Next, step S12 will be described. In step S12, if there is a request satisfying condition (d) in the first storage unit 13 (YES in step S12), the processing proceeds to step S13. If there is no request satisfying condition (d) in the first storage unit 13 (NO in step S12), the processing proceeds to step S4. Steps S4 to S9 are similar to those of FIG. 2. As illustrated in FIG. 6, determinations are made in the order of selection defined in the second exemplary embodiment by executing step S12 before steps S4 to S6.

In step S13, the first control unit 11 selects the oldest request 111 among the requests satisfying condition (d) in the first storage unit 13 using <request number> in the IDs assigned by the first control unit 11. The processing proceeds to step S10. In step S10, if there is an empty entry in the second storage unit 14, the first control unit 11 transmits the selected request 111 to the second control unit 12. The processing then returns to steps S1 to S3 and S11. The second control unit 12 stores the request 111 in the empty entry in the second storage unit 14.

Next, an operation related to the second exemplary embodiment will be described with reference to FIGS. 7A and 7B. In the following description, like the first exemplary embodiment, the number of entries in the first storage unit 13 is six (m=6) and the number of entries in the second storage unit 14 is eight (n=8). The notation used in FIGS. 7A and 7B will be described. In FIGS. 7A and 7B, requests have priority levels. A request is thus expressed in the following format:

<request type><request number> (priority level, target bank, target page).

The foregoing <request type>, <request number>, target bank, and target page are similar to those in the first exemplary embodiment. The priority level refers to that of the request.

As described above, there are eight priority levels ranging from 0 that is the lowest to 7 that is the highest.

FIG. 7A illustrates the states of the first and second storage units 13 and 14 at a certain time.

All the six entries in the first storage unit 13 illustrated in FIG. 7A contain requests.

The second storage unit 14 stores two requests. The two requests stored in the second storage unit 14 are RD09 (3, 1, 3) and RD10 (4, 1, 3).

In step S11 of extracting a request satisfying condition (d), the result of procedure E for extracting requests of which the target banks agree is as follows:

REQ1(p)={RD11 (1, 1, 2), RD12 (5, 1, 0), RD13 (1, 1, 0), RD14 (6, 1, 1)}; and
REQ2={RD10 (4, 1, 3)}.

The result of procedure F for extracting requests REQ1(p) of which the target pages do not agree with that of REQ2 is as follows:

PAGEMISSREQ1(r)={RD11 (1, 1, 2), RD12 (5, 1, 0), RD13 (1, 1, 0), RD14 (6, 1, 1)}.

Lastly, in procedure G for comparing the priority levels of PAGEMISSREQ1(r) with that of REQ2, the first control unit 11 extracts requests having a priority level higher than 4 from PAGEMISSREQ1(r) since the priority level of REQ2=RD10 (4, 1, 3) is 4.

In the foregoing example, the two requests RD12 (5, 1, 0) and RD14 (6, 1, 1) satisfy the extraction condition.

Next, in step S13 of FIG. 6, the first control unit 11 selects the oldest request. In step S13, the first control unit 11 compares RD12 (5, 1, 0) with RD14 (6, 1, 1), and selects RD12 (5, 1, 0) since RD12 (5, 1, 0) is older.

Next, the first control unit 11 transmits RD12 (5, 1, 0) to the second control unit 12. The second control unit 12 receives RD12 (5, 1, 0) transmitted from the first control unit 11, and stores RD12 (5, 1, 0) in the second storage unit 14. The first control unit 11 deletes RD12 (5, 1, 0) from the first storage unit 13. FIG. 7B illustrates the states of the first and second storage units 13 and 14 after the completion of the series of operations.

As illustrated in FIG. 7B, there are three requests RD09 (3, 1, 3), RD10 (4, 1, 3), and RD12 (5, 1, 0) in the second storage unit 14.

The second control unit 12 reorders the foregoing three requests, executes RD12 (5, 1, 0) of the higher priority level first, and then RD10 (4, 1, 3).

RD10 (4, 1, 3) and RD12 (5, 1, 0) cause a page-miss since the target pages are different. However, the DRAM access penalty is small since an active command can be immediately issued.

Next, a memory controller 1 according to a third exemplary embodiment will be described. The first control unit 11 according to the third exemplary embodiment selects a request from in-first-storage-unit requests 104 based on the following condition (e):

(e) The request is an in-first-storage-unit request 104 stored in the first storage unit 13,
the request has the highest priority level among in-first-storage-unit requests 104 of the same target bank, and
the request satisfies one of conditions (a), (b), (c), and (d).

Figure 8:
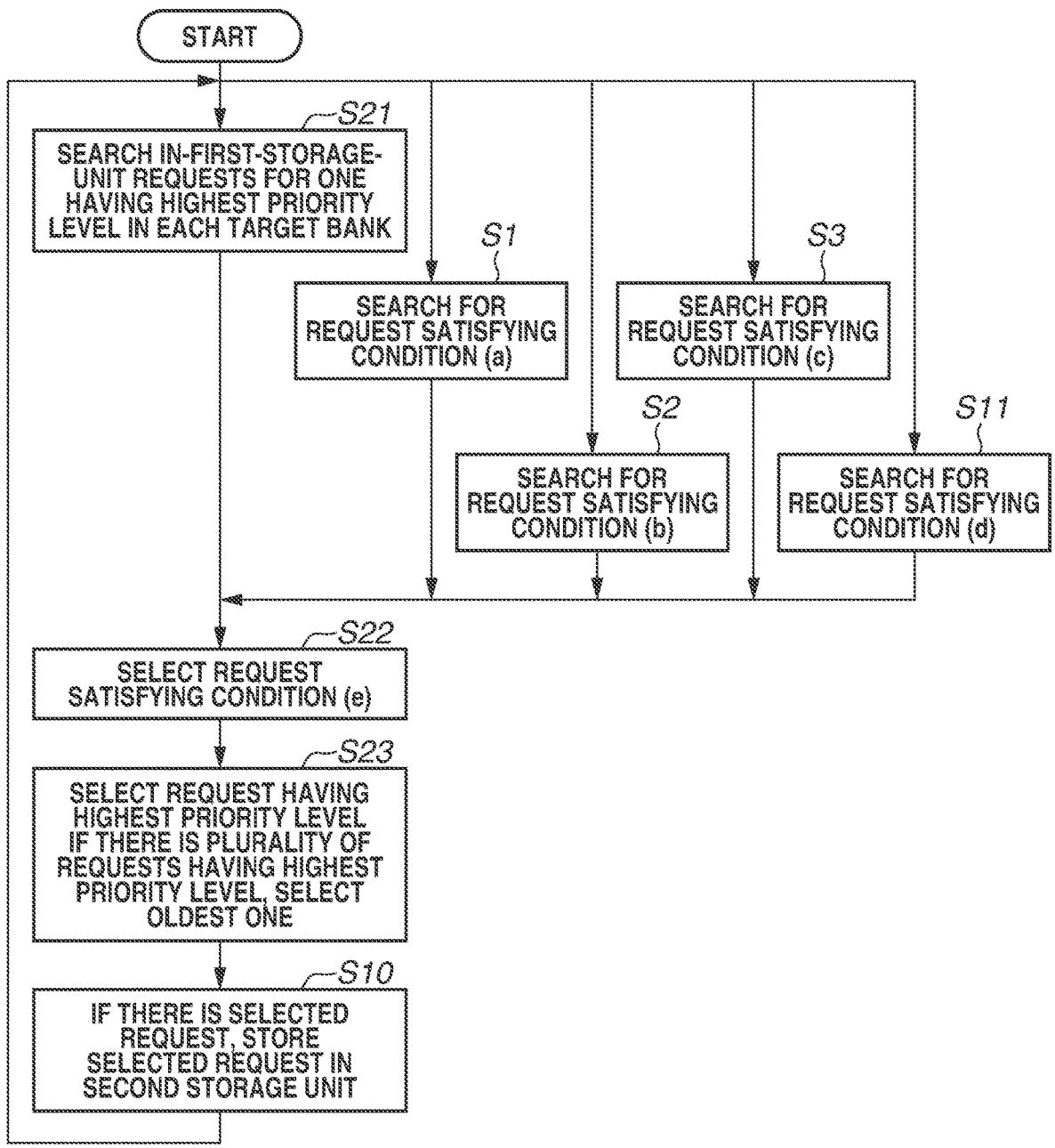
FIG. 8 is a diagram illustrating a procedure for selecting a request from a first storage unit.

Next, the operation by which the first control unit 11 according to the third exemplary embodiment selects a request from the in-first-storage-unit requests 104 will be described in more detail with reference to the flowchart of FIG. 8. Steps S1, S2, S3, S10, and S11 of FIG. 8 are similar to those illustrated in FIG. 2 or 6. Steps other than steps S1, S2, S3, S10, and S11 will therefore be mainly described. In the following description, the number of entries in the first storage unit 13 is m.

In step S21, the first control unit 11 searches the in-first-storage-unit requests 104 for a request satisfying the first half of condition (e), i.e., one having the highest priority level in each target bank along with steps S1 to S3 and S11. In steps S1, S2, S3, and S11, the first control unit 11 searches for a request satisfying conditions (a), (b), (c), and (d), respectively.

In step S22, the first control unit 11 selects a request satisfying condition (e) based on the results of steps S21, S1, S2, S3, and S11. More specifically, in step S22, the first control unit 11 selects a request that has the highest priority level among the in-first-storage-unit requests 104 of the same target bank and satisfies one of conditions (a) to (d). Here, a plurality of requests satisfying condition (e) may be selected.

In step S23, if there is a plurality of requests selected in step S22, the first control unit 11 selects one of the requests as a request 111. Here, the first control unit 11 selects one having the highest priority level among the plurality of selected requests as the request 111. If there is a plurality of requests having the highest priority level, the first control unit 11 selects the oldest one among the plurality of requests having the highest priority level as the request 111, using the IDs assigned by the first control unit 11.

In step S10, if there is a selected request 111 and there is an empty entry in the second storage unit 14, the first control unit 11 transmits the selected request 111 to the second control unit 12. The processing returns to steps S1 to S3, S11, and S21. The second control unit 12 stores the request 111 in the empty entry in the second storage unit 14.

Next, an operation according to the third exemplary embodiment will be described with reference to FIGS. 9A and 9B as well. In the following description, like the first and second exemplary embodiments, the number of entries in the first storage unit 13 is six (m=6) and the number of entries in the second storage unit 14 is eight (n=8). The notation used in FIGS. 9A and 9B is similar to that in the second exemplary embodiment.

Figure 9A:
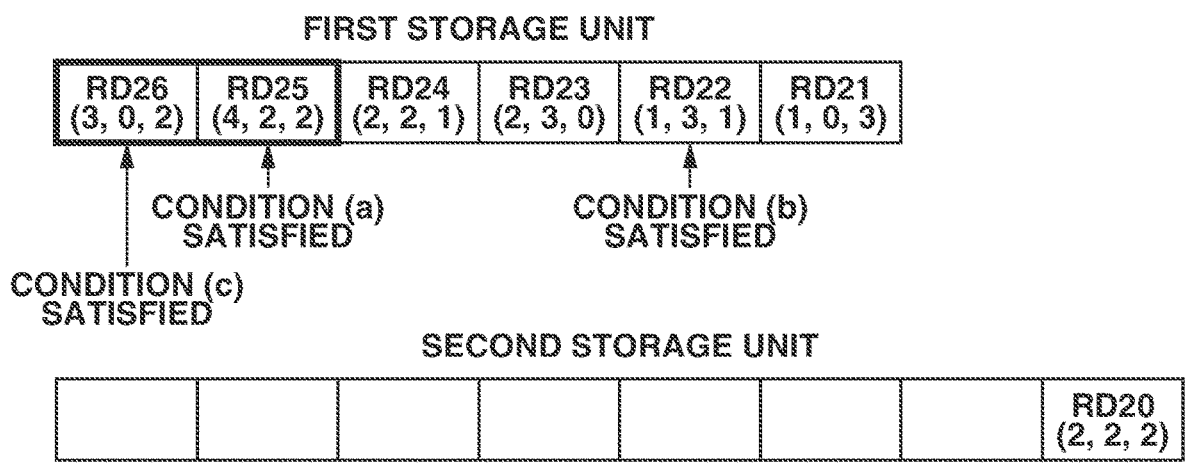
FIGS. 9A and 9B are diagrams illustrates the first storage unit and a second storage unit.
Figure 9B:
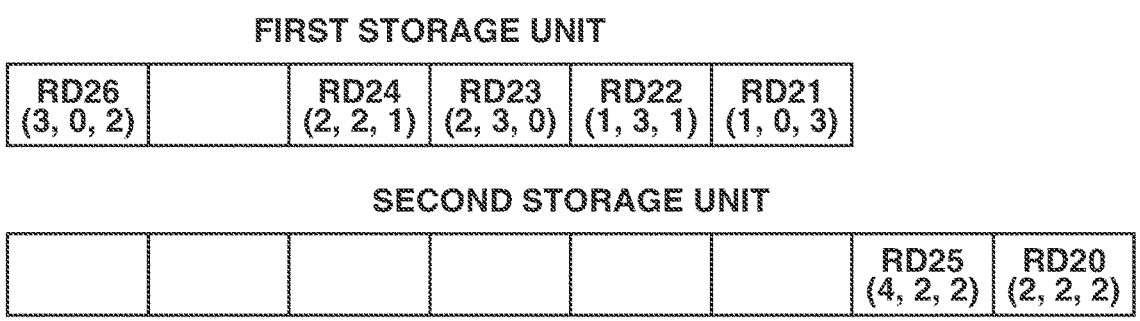

FIG. 9A illustrates the states of the first and second storage units 13 and 14 at a certain time.

All the six entries in the first storage unit 13 illustrated in FIG. 9A contain requests.

The second storage unit 14 stores a request RD20 (2, 2, 2). The six requests stored in the first storage unit 13 are listed bank by bank as follows:

Bank 0: RD21 (1, 0, 3) and RD26 (3, 0, 2);
Bank 1: none;
Bank 2: RD24 (2, 2, 1) and RD25 (4, 2, 2); and Bank 3: RD22 (1, 3, 1) and RD23 (2, 3, 0).

Suppose that the DRAM bank and page states 113 have values given by the following Exp. (6):

$$\begin{pmatrix} \text{state of bank 0:CLOSED} & - & \text{active} \\ \text{state of bank 1:OPEN} & 3 & - \\ \text{state of bank 2:OPEN} & 2 & - \\ \text{state of bank 3:OPEN} & 1 & \text{precharge} \\ \vdots & \vdots & \vdots \end{pmatrix} \quad (6)$$

Here, the first control unit 11 executes step S21 of FIG. 8 to search the in-first-storage-unit requests 104 for a request having the highest priority level bank by bank. The result of the application of step S21 to the state of the first storage unit 13 illustrated in FIG. 9A is as follows:

Bank 0: RD26 (3, 0, 2);
Bank 1: none;
Bank 2: RD25 (4, 2, 2); and
Bank 3: RD23 (2, 3, 0).

Similarly, the first control unit 11 searches for requests satisfying conditions (a) to (d) in parallel. From Exp. (6), the bank corresponding to condition (b), i.e., where the target page is open and capable of precharge is bank 3. From Exp. (6), the bank corresponding to condition (c), i.e., where the target page is closed and capable of activation is bank 0. The results are listed as follows:

Request satisfying condition (a): RD25 (4, 2, 2);
Request satisfying condition (b): RD22 (1, 3, 1);
Request satisfying condition (c): RD26 (3, 0, 2); and
Request satisfying condition (d): none.

Next, in step S22 of FIG. 8, the first control unit 11 selects a request satisfying the last half of condition (e), i.e., one satisfying one of conditions (a) to (d). In the foregoing example, two requests RD25 (4, 2, 2) and RD26 (3, 0, 2) satisfy the last half of condition (e).

Next, in step S23 of FIG. 8, the first control unit 11 selects the oldest request. In step S23, the first control unit 11 compares RD25 (4, 2, 2) with RD26 (3, 0, 2), and selects RD25 (4, 2, 2) since the RD25 (4, 2, 2) is older.

Lastly, in step S10 of FIG. 8, the first control unit 11 transmits RD25 (4, 2, 2) to the second control unit 12. The second control unit 12 receives RD25 (4, 2, 2) transmitted from the first control unit 11, and stores RD25 (4, 2, 2) in the second storage unit 14. The first control unit 11 deletes RD25 (4, 2, 2) from the first storage unit 13. FIG. 9B illustrates the states of the first and second storage units 13 and 14 after the completion of the series of operations. AS illustrated in FIG. 9B, the second storage unit 14 stores two requests RD20 (2, 2, 2) and RD25 (4, 2, 2).

The second control unit 12 reorders the foregoing two requests, executes RD25 (4, 2, 2) of the higher priority level first, and then executes RD20 (2, 2, 2).

RD20 (2, 2, 2) and RD25 (4, 2, 2) do not cause a page-miss or DRAM access penalty since the target pages are the same.

Next, a memory controller 1 according to a fourth exemplary embodiment will be described. Like the memory controller 1 according to the third exemplary embodiment, the memory controller 1 according to the fourth exemplary embodiment includes at least a first control unit 11, a second control unit 12, a first storage unit 13, and a second storage unit 14. Functions related to the fourth exemplary embodiment will now be mainly described. A description of functions similar to those of the third exemplary embodiment will be omitted.

The second storage unit 14 includes one or more entries (hereinafter, referred to as high priority request-specific entries) that can store only requests having a priority level higher than a threshold (hereinafter, referred to as high priority requests), and entries other than the high priority request-specific entries. The entries other than the high priority request-specific entries can store requests having a priority level lower than the threshold. In selecting a request from in-first-storage-unit requests 104, the first control unit 11 compares the priority levels of the in-first-storage-unit requests 104 with a previously defined threshold, and selects a high priority request. If there is an empty entry other than the high priority request-specific entries, the second control unit 12 stores a request into the empty entry other than the high priority request-specific entries regardless of its priority level. If there is no empty entry other than the high priority request-specific entries, the second control unit 12 stores a high priority request into a high priority request-specific entry.

Figure 10:
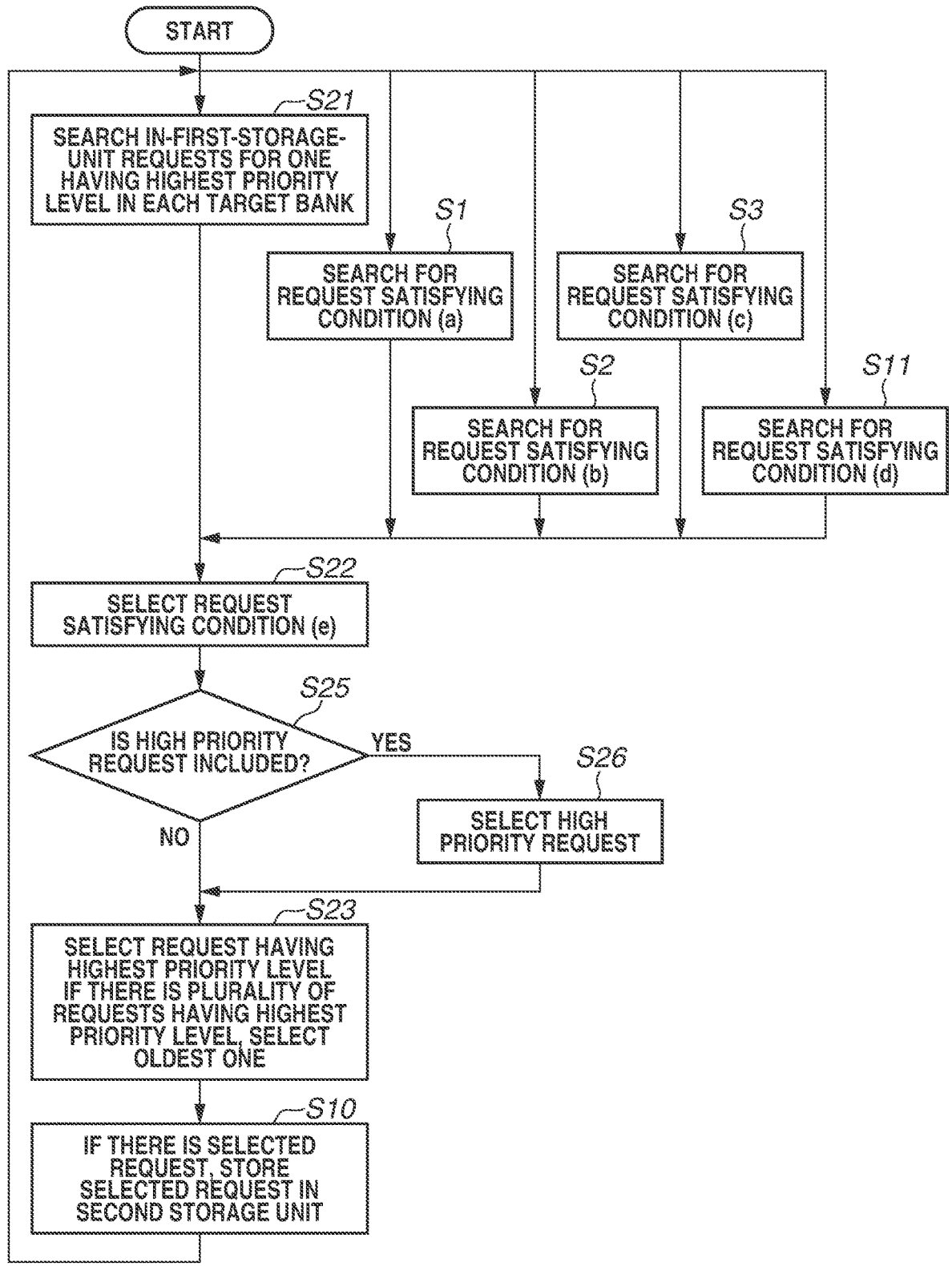
FIG. 10 is a flowchart illustrating a procedure for selecting a request from a first storage unit.

Next, the operation where the first control unit 11 according to the fourth exemplary embodiment selects a request from the in-first-storage-unit requests 104 will be described in more detail with reference to the flowchart of FIG. 10. In FIG. 10, steps S25 and S26 are added to the steps of FIG. 8. Steps S1, S2, S3, S11, S21, S22, and S23 of FIG. 10 are similar to those illustrated in FIG. 8. Steps S25, S26, and S10 other than steps S1, S2, S3, S11, S21, S22, and S23 will therefore be mainly described.

After step S22, i.e., in step S25, the first control unit 11 determines whether a high priority request is included in the requests extracted in step S22. If a high priority request is included (YES in step S25), the processing proceeds to step S26. If no high priority request is included (NO in step S25), the processing proceeds to step S23.

In step S26, the first control unit 11 extracts a high priority request from the requests extracted in step S22 (requests satisfying condition (e)). The processing proceeds to step S23. Step S23 is similar to that of FIG. 8.

In step S10, if a request having a priority level higher than the threshold is included in the requests satisfying condition (e) and there is an empty entry in the second storage unit 14, the first control unit 11 selects the request having the priority level higher than the threshold as a request 111.

The first control unit 11 then transmits the request 111 to the second control unit 12.

Next, a case where the requests satisfying condition (e) include no request having a priority level higher than the threshold but a request having a priority level lower than the threshold and there is an empty entry other than the high priority request-specific entries in the second storage unit 14 will be described. In such a case, the first control unit 11 selects the request having the priority level lower than the threshold as a request 111, and transmits the request 111 to the second control unit 12.

Next, a case where the requests satisfying condition (e) include no request having a priority level higher than the threshold but a request having a priority level lower than the threshold and there is no empty entry other than the high priority request-specific entries in the second storage unit 14 will be described. In such a case, the processing simply returns to steps S1 to S3, S11, and S21.

If there is neither a request having a priority level higher than the threshold nor a request having a priority level lower than the threshold, the processing simply returns to steps S1 to S3, S11, and S21.

Because of steps S25 and S26, the second control unit 12 stores high priority requests into the second storage unit 14 by priority. In other words, according to the fourth exemplary embodiment, requests having a high priority level can be reordered by priority.

Figure 11:
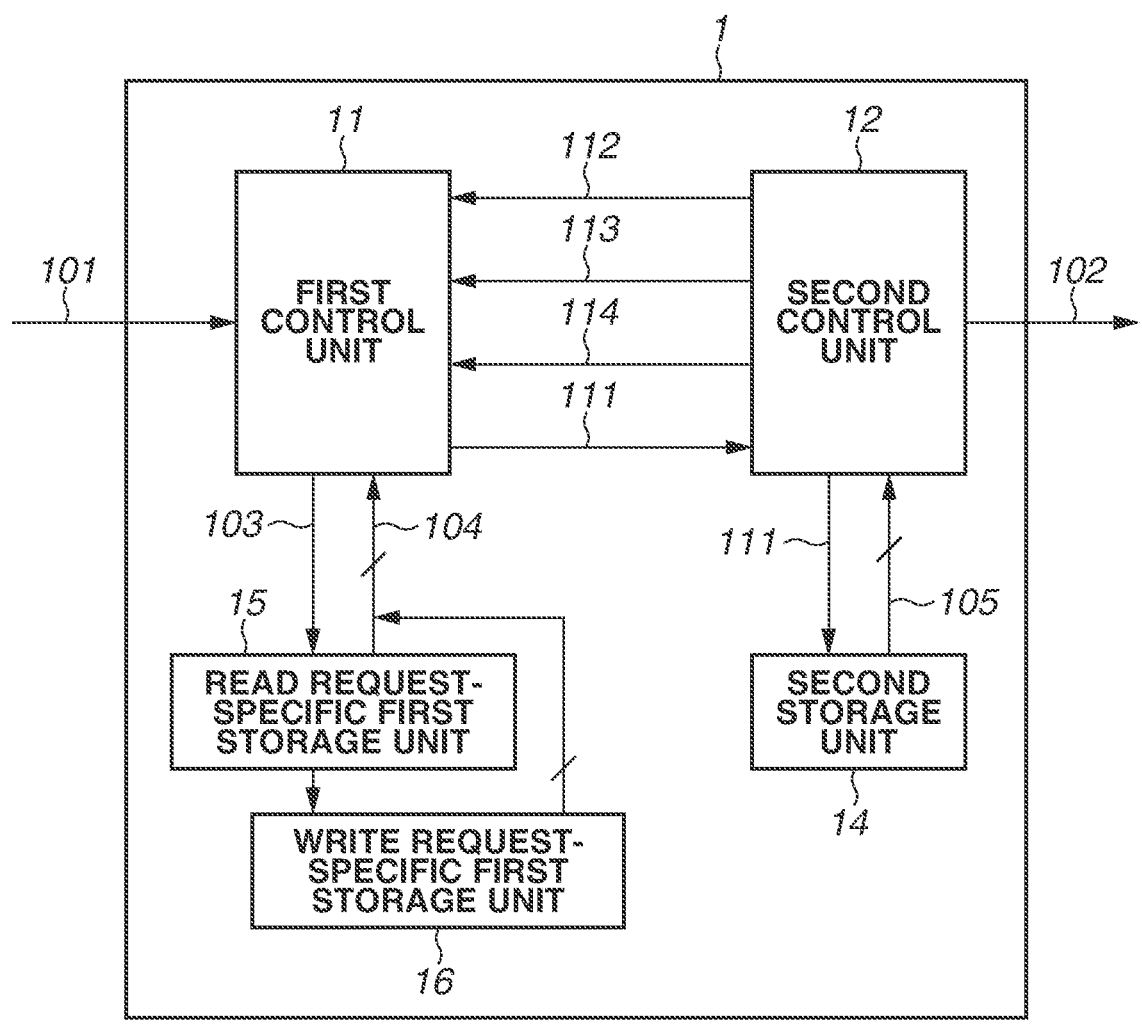
FIG. 11 is a diagram illustrating a configuration example of a memory controller.

FIG. 11 is a diagram illustrating a configuration example of a memory controller 1 according to a fifth exemplary embodiment. As illustrated in FIG. 11, the memory controller 1 includes at least a first control unit 11, a second control unit 12, a read request-specific first storage unit 15, a write request-specific first storage unit 16, and a second storage unit 14. Of these, the second control unit 12 and the second storage unit 14 are similar to those described in the first to third exemplary embodiments. The read request-specific first storage unit 15 and the write request-specific first storage unit 16 are obtained by dividing the first storage unit 13 of FIG. 1. The read request-specific first storage unit 15 is a storage unit for storing read requests. The write request-specific first storage unit 16 is a storage unit for storing write requests.

Receiving a request 101, the first control unit 11 assigns the request 101 an ID for the memory controller 1 to identify the request 101 by, and generates an IDed request 103. If <request type> of the ID is RD, the first control unit 11 then stores the IDed request 103 in the read request-specific first storage unit 15. If <request type> of the ID is WR, the first control unit 11 stores the IDed request 103 in the write request-specific first storage unit 16.

The first control unit 11 selects a request satisfying a condition from in-first-storage-unit requests 104 stored in the read and write request-specific first storage units 15 and 16, and transmits the selected request 111 to the second control unit 12. This operation is similar to that of the first control unit 11 described in the first to third exemplary embodiments.

Next, the read and write request-specific first storage units 15 and 16 according to the fifth exemplary embodiment will be described. The read request-specific first storage unit 15 stores IDed requests 103 having IDs of which <request type> is RD.

Meanwhile, the write request-specific first storage unit 16 stores IDed requests 103 having IDs of which <request type> is WR.

The first control unit 11 can read all the entries of both the read and write request-specific first storage units 15 and 16 in parallel. The in-first-storage-unit requests 104 includes collectively the requests read from both the read and write request-specific first storage units 15 and 16.

According to the first to fifth exemplary embodiments, the memory controller 1 limits the search range of reordering targets to the second storage unit 14. Since the number of entries in the storage unit to store the reordering targets is smaller than in the prior art, the area of the reordering logic circuit is smaller than in the prior art. In storing requests in the second storage unit 14, the memory controller 1 selects and stores the requests into the second storage unit 14 so that the combination of the requests reduces DRAM access penalty. The memory controller 1 thus has the effect of reducing the area of the reordering logic circuit compared to the prior art while maintaining the reordering function, and provides industrially applicable effects utilizing the effect.

The memory controller 1 includes the first and second storage units 13 and 14 into which a storage unit for storing requests is divided, and generates DRAM commands 102 from a group of requests in the second storage unit 14 in parallel. Since the DRAM commands 102 are generated only from the group of requests in the second storage unit 14, the search range of reordering targets is limited to the second storage unit 14. With such a configuration, the memory controller 1 has the effect of reducing the area of the reordering logic circuit compared to the prior art while maintaining the reordering function.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-074084, filed Apr. 26, 2021, which is hereby incorporated by reference herein in its entirety.

What is claimed is:

1. A memory controller configured to control a dynamic random access memory (DRAM), comprising:
    a first control circuit configured to store a request received by the memory controller in a first storage circuit, and select a request from requests stored in the first storage circuit; and
    a second control circuit configured to store the request selected by the first control circuit in a second storage circuit, reorder requests stored in the second storage circuit, generate a DRAM command, and issue the DRAM command to the DRAM,
    wherein the first control circuit is configured to select the request satisfying a condition (e) that the request is one stored in the first storage circuit, the request has a highest priority level among requests which are stored in the first storage circuit, based on comparison of at least one of target banks and target pages of the requests stored in the second storage circuit and at least one of target banks and target pages of the requests stored in the first storage circuit and
    wherein the first control circuit is configured to:

in a case where there is a request having a priority level higher than the threshold among a request or requests satisfying the condition (e) and there is an empty entry in the second storage circuit, select the request having the priority level higher than the threshold, and in a case where there is no request having a priority level higher than the threshold and there is a request having a priority level lower than the threshold among the request(s) satisfying the condition (e) and a second entry in the second storage circuit is empty, select the request having the priority level lower than the threshold.

2. The memory controller according to claim 1, wherein the first control circuit is configured to select a request satisfying one of following conditions:
(a) the request is one stored in the first storage circuit, and a target bank and a target page of the request stored in the first storage circuit agree with those of one of the requests stored in the second storage circuit;
(b) the request is one stored in the first storage circuit, the target bank of the request stored in the first storage circuit does not agree with that of any of the requests stored in the second storage circuit, the target page of the request stored in the first storage circuit is open, and a precharge command is issuable to the target page of the request stored in the first storage circuit; and
(c) the request is one stored in the first storage circuit, the target bank of the request stored in the first storage circuit does not agree with that of any of the requests stored in the second storage circuit, the target page of the request stored in the first storage circuit is closed, and an active command is issuable to the target page of the request stored in the first storage circuit.

3. The memory controller according to claim 2, wherein the condition (a) is that the request is one stored in the first storage circuit, and the target bank and the target page of the request stored in the first storage circuit agree with those of a request residing in the second storage circuit for a shortest time among the requests stored in the second storage circuit.

4. The memory controller according to claim 2, wherein the first control circuit is configured to:
in a case where there is a request satisfying the condition (a), select the request satisfying the condition (a);
in a case where there is no request satisfying the condition (a) and there is a request satisfying the condition (b), select the request satisfying the condition (b); and
in a case where there is no request satisfying the condition (a), there is no request satisfying the condition (b), and there is a request satisfying the condition (c), select the request satisfying the condition (c).

5. The memory controller according to claim 2, wherein the first control circuit is configured to:
in a case where there is a request satisfying the condition (a), select an oldest request satisfying the condition (a);
in a case where there is a request satisfying the condition (b), select an oldest request satisfying the condition (b); and
in a case where there is a request satisfying the condition (c), select an oldest request satisfying the condition (c).

6. The memory controller according to claim 2, wherein the request has a priority level as to issuance of the request to the DRAM.

7. The memory controller according to claim 6, wherein the first control circuit is configured to select a request satisfying one of:
the condition (a);
the condition (b);
the condition (c); and
a condition (d) that the request is one stored in the first storage circuit, the target bank of the request stored in the first storage circuit agrees with that of one of the requests stored in the second storage circuit, the target page of the request stored in the first storage circuit does not agree with that of any of the requests stored in the second storage circuit, and a priority level of the request stored in the first storage circuit is higher than that of the request stored in the second storage circuit.

8. The memory controller according to claim 7, wherein the condition (d) is that the request is one stored in the first storage circuit, the target bank of the request stored in the first storage circuit agrees with that of one of the requests stored in the second storage circuit, the target page of the request stored in the first storage circuit does not agree with that of a request residing in the second storage circuit for a shortest time among requests which are stored in the second storage circuit and of which the target banks agree with that of the request stored in the first storage circuit, and the priority level of the request stored in the first storage circuit is higher than that of the request residing in the second storage circuit for the shortest time among the requests which are stored in the second storage circuit and of which the target banks agree with that of the request stored in the first storage circuit.

9. The memory controller according to claim 7, wherein the first control circuit is configured to:
in a case where there is a request satisfying the condition (d), select the request satisfying the condition (d);
in a case where there is no request satisfying the condition (d) and there is a request satisfying the condition (a), select the request satisfying the condition (a);
in a case where there is no request satisfying the condition (d), there is no request satisfying the condition (a), and there is a request satisfying the condition (b), select the request satisfying the condition (b); and
in a case where there is no request satisfying the condition (d), there is no request satisfying the condition (a), there is no request satisfying the condition (b), and there is a request satisfying the condition (c), select the request satisfying the condition (c).

10. The memory controller according to claim 7, wherein the first control circuit is configured to:
in a case where there is a request satisfying the condition (d), select an oldest request satisfying the condition (d);
in a case where there is a request satisfying the condition (a), select an oldest request satisfying the condition (a);
in a case where there is a request satisfying the condition (b), select an oldest request satisfying the condition (b); and
in a case where there is a request satisfying the condition (c), select an oldest request satisfying the condition (c).

11. The memory controller according to claim 7, wherein the first control circuit is configured to select a request satisfying the condition (e) that the request is one stored in the first storage circuit, the request has a highest priority level among requests which are stored in the first storage circuit and of which the target banks agree, and the request satisfies one of the conditions (a), (b), (c), and (d).

12. The memory controller according to claim 11, wherein the first control circuit is configured to, in a case where there is a plurality of selected requests, select a request having a highest priority level among the plurality of selected requests.

13. The memory controller according to claim 12, wherein the first control circuit is configured to, in a case where there is a plurality of requests having the highest priority level, select an oldest request among the plurality of requests having the highest priority level.

14. The memory controller according to claim 11, wherein the second storage circuit includes a first entry configured to store only a request having a priority level higher than a threshold, and a second entry configured to store a request having a priority level lower than the threshold.

15. The memory controller according to claim 1, wherein the first storage circuit includes a storage circuit configured to store a read request and a storage circuit configured to store a write request.

16. A control method of a memory controller configured to control a DRAM, the control method comprising:
   storing a request received by the memory controller in a first storage circuit, and selecting a request from requests stored in the first storage circuit; and
   storing the selected request in a second storage circuit, reordering requests stored in the second storage circuit, generating a DRAM command, and issuing the DRAM command to the DRAM,
   wherein the request selected is a request satisfying a condition that the request is one stored in the first storage circuit, the request has a highest priority level among requests which are stored in the first storage circuit based on comparison of at least one of target banks and target pages of the requests stored in the second storage circuit and at least one of target banks and target pages of the requests stored in the first storage circuit, and
   in a case where there is a request having a priority level higher than the threshold among a request or requests satisfying the condition and there is an empty entry in the second storage circuit, selecting the request having the priority level higher than the threshold, and
   in a case where there is no request having a priority level higher than the threshold and there is a request having a priority level lower than the threshold among the request(s) satisfying the condition and a second entry in the second storage circuit is empty, select the request having the priority level lower than the threshold.

17. A non-transitory storage medium storing a program causing a memory controller configured to control a DRAM to execute a control method, the control method comprising:
   storing a request received by the memory controller in a first storage circuit, and selecting a request from requests stored in the first storage circuit; and
   storing the selected request in a second storage circuit, reordering requests stored in the second storage circuit, generating a DRAM command, and issuing the DRAM command to the DRAM,
   wherein the request selected is a request satisfying a condition that the request is one stored in the first storage circuit, the request has a highest priority level among requests which are stored in the first storage circuit based on comparison of at least one of target banks and target pages of the requests stored in the second storage circuit and at least one of target banks and target pages of the requests stored in the first storage circuit, and
   in a case where there is a request having a priority level higher than the threshold among a request or requests satisfying the condition and there is an empty entry in the second storage circuit, selecting the request having the priority level higher than the threshold, and
   in a case where there is no request having a priority level higher than the threshold and there is a request having a priority level lower than the threshold among the request(s) satisfying the condition and a second entry in the second storage circuit is empty, select the request having the priority level lower than the threshold.

* * * * *